ROTH & SHANE.
Gate.
No. 64,150. Patented April 23, 1867.
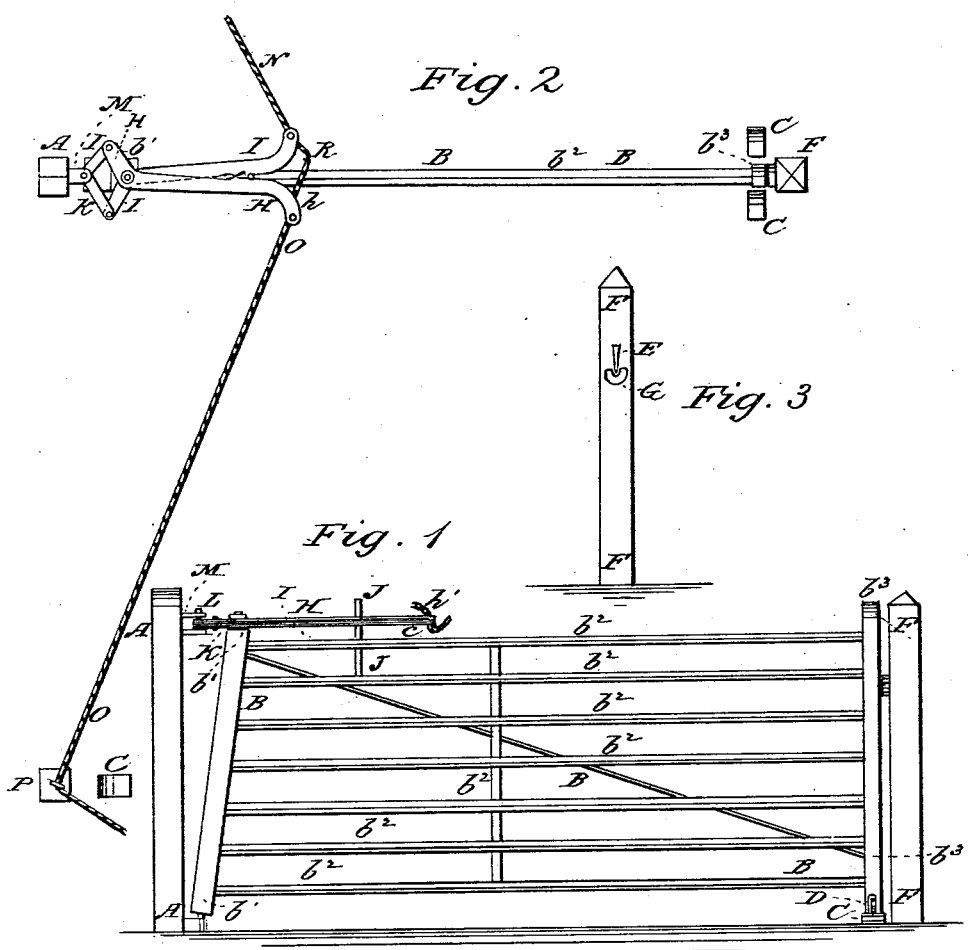
Witnesses:
Theo Tusche
Inventors:
Elias Roth
Geo Shane

United States Patent Office.

ELIAS ROTH AND GEORGE SHANE, OF NEW OXFORD, PENNSYLVANIA.

Letters Patent No. 64,150, dated April 23, 1867.

IMPROVEMENT IN GATES.

*The Schedule referred to in these Letters Patent and making part of the same.*

TO ALL WHOM IT MAY CONCERN:

Be it known that we, ELIAS ROTH and GEORGE SHANE, of New Oxford, in the county of Adams, and State of Pennsylvania, have invented a new and useful Improvement in Gates; and we do hereby declare that the following is a full, clear, and exact description thereof, which will enable others skilled in the art to make and use the same, reference being had to the accompanying drawings, forming part of this specification, in which—

Figure 1 is a side view of our improved gate.

Figure 2 is a top or plan view of the same.

Figure 3 is a detail view of the front gate-post.

Similar letters of reference indicate like parts.

Our invention has for its object to furnish an improved gate of that class that is so constructed and arranged that they may be opened and closed by a person in a vehicle or on horseback, which shall be simple in construction, cheap, light, and not liable to get out of order; and it consists in the combination and arrangement of the bent levers and bars, or links, which form the upper hinge, and by which the gate is swung open and shut, with the gate, ropes, and rear post, in placing a roller under the front upright cross-bar of the gate, and in the peculiar construction of the catch and of the horizontal bars of the gate; the whole being constructed and arranged as hereinafter more fully described.

A is the rear post to which the gate is hinged. B is the gate, the rear cross-bar $b^1$ of which is slightly inclined forward, as shown in fig. 1. The lower end of the cross-bar $b$ pivoted to a socket attached to the lower part of the post A, and its upper end is pivoted to the upper part of said post, in the manner hereinafter described. The horizontal rails $b^2$ of the gate B are made oval in their cross-section, and they are placed in the gate with their longest diameter horizontal, so that the gate may be swung open and shut with almost equal facility in windy and in fair weather. The front cross-bar $b^3$ is vertical, and has a small roller, D, attached to its lower end to facilitate its operation and enables it to more readily pass over the lower catches C, by which the lower part of the gate is held in position when open and shut. The upper part of the gate is held in position by a stationary pin attached to the forward side of the front cross-bar $b^3$, which, as the gate is swung closed, strikes against the wedge-shaped stop-catch E attached to the front side of the post F, down the inclined side of which it slides and drops into the curved catch or socket G, the stop-catch E checking the forward movement of the gate. To the upper end of the rear cross-bar $b^1$ are pivoted two bent levers H and I, the forward ends $h'$ and $i'$ of which are curved outward, and have shoulders or catches formed upon them which take hold of the vertical pin J which keeps them in their places and forms a support to the one lever while the other is being operated. If desired the ends $h'$ and $i'$ of the levers H and I may be connected to each other by a short cord, R, as shown in fig. 2. To the rear ends of the levers H and I are pivoted the forward ends of the short bars K and L, the rear ends of which are brought together and pivoted to the ears M attached to the upper part of the post A. To the forward ends of the levers H and I are attached the ends of the ropes N and O which pass back to the tops of the posts P, one of which is shown in fig. 2. By pulling upon the end of one of the ropes, as O, the forward end of the lever H is drawn back, and the first effect is to slightly incline the forward end of the gate B to one side, the second effect is to slightly raise the said forward end of the gate out of the catches C and G, and the third effect is to swing the gate open. After passing through, by pulling upon the end of the other rope, as N, the gate will be closed. Persons on foot can easily open the gate to pass through without touching the ropes, by slightly lifting its forward end. None of the posts A E P need be any higher than ordinary fence posts. A gate thus constructed operates equally well in dry, wet, or windy weather, is not liable to be disarranged, and will not clog with snow, as the operation of opening and closing the gate raises its forward end so that it swings above the snow.

What we claim as new, and desire to secure by Letters Patent, is—

1. The combination and arrangement of the bent levers H and I, and short bars K and L, with the gate B, ropes O and N, and post A, substantially as herein shown and described and for the purpose set forth.

2. Placing a roller, D, under the front cross-bar $b^3$ of the gate B, substantially as herein shown and described and for the purpose set forth.

3. The catch G E, constructed and arranged substantially as herein shown and described and for the purpose set forth.

4. Forming the horizontal bars $b^2$ of the gate B so that they may be oval in their cross-section, and placing them with their longest diameter horizontal, substantially as herein shown and described and for the purpose set forth.

ELIAS ROTH,
GEORGE SHANE.

Witnesses:
A. S. HIMES,
J. W. HENDRIX.